United States Patent
Desagulier et al.

(10) Patent No.: US 9,643,367 B2
(45) Date of Patent: May 9, 2017

(54) METHOD FOR PRODUCING A COMPOSITE MIRROR AND COMPOSITE MIRROR OBTAINED WITH SAME

(75) Inventors: Christian Desagulier, Paris (FR); Stephane Baril, Triel sur Seine (FR)

(73) Assignee: ASTRIUM SAS, Paris (FR)

( * ) Notice: Subject to any disclaimer, the term of this patent is extended or adjusted under 35 U.S.C. 154(b) by 1295 days.

(21) Appl. No.: 13/522,603

(22) PCT Filed: Jan. 17, 2011

(86) PCT No.: PCT/EP2011/050495
§ 371 (c)(1),
(2), (4) Date: Jul. 17, 2012

(87) PCT Pub. No.: WO2011/089079
PCT Pub. Date: Jul. 28, 2011

(65) Prior Publication Data
US 2012/0295521 A1   Nov. 22, 2012

(30) Foreign Application Priority Data

Jan. 20, 2010   (FR) ..................................... 10 50354

(51) Int. Cl.
*B29D 11/00*   (2006.01)
*G02B 5/08*   (2006.01)
*G02B 7/183*   (2006.01)

(52) U.S. Cl.
CPC ...... *B29D 11/00596* (2013.01); *G02B 5/0808* (2013.01); *G02B 7/183* (2013.01)

(58) Field of Classification Search
CPC . G02B 7/183; G02B 5/0808; B29D 11/00596
See application file for complete search history.

(56) References Cited

U.S. PATENT DOCUMENTS

| 6,176,588 B1 | 1/2001 | Davis, Jr. et al. |
| 2006/0251904 A1* | 11/2006 | Ealey ....................... G02B 5/08 428/426 |

FOREIGN PATENT DOCUMENTS

| JP | 56088101 A | 7/1981 |
| JP | 58169102 A | * 10/1983 |

(Continued)

OTHER PUBLICATIONS

French Search Report for FR 1050354; Aug. 19, 2010 International Search Report for PCT/EP2011/050495; Feb. 16, 2011.

*Primary Examiner* — Mathieu Vargot
(74) *Attorney, Agent, or Firm* — Pearne & Gordon, LLP

(57) ABSTRACT

A method for producing a composite mirror. It comprises the steps of providing a glass blank with low coefficient of expansion, machining a convex shape (4) in the glass blank, laying a front skin (6) impregnated with resin over the convex shape (4) of the glass blank (2), machining in a rear supporting structure (8) a concave shape matching the convex shape machined in the glass blank (2), gluing the concave shape (10) of the supporting structure (8) onto the convex shape of the glass blank (2), machining a convex shape in the supporting structure, laying a rear skin (14) impregnated with resin on a mold, gluing the rear skin (14) onto the convex shape of the supporting structure (8), turning over the assembly so that the blank (2) lies in the upper portion of the assembly, machining and polishing a mirror in the glass blank (2).

5 Claims, 4 Drawing Sheets

(56) References Cited

FOREIGN PATENT DOCUMENTS

| JP | 61238002 A | 10/1986 |
| JP | 63131102 A | 6/1988 |
| JP | 1-291201 | * 11/1989 |

* cited by examiner

METHOD FOR PRODUCING A COMPOSITE MIRROR AND COMPOSITE MIRROR OBTAINED WITH SAME

The present invention concerns a method for producing a composite mirror. It also concerns a composite mirror obtained using this method.

The obtaining of optical mirrors comes up against the difficulty of reaching temperature-stable optical precision, in particular at short wavelengths for a spectrum corresponding to wavelengths of visible radiation (from 400 nm to 700 nm) and for the near infrared. This optical precision must be obtained globally and locally. In other words, it must be obtained at every point of the mirror and for the general shape thereof. The mirror must be capable of functioning over a broad range of temperatures ranging from 20° C. for an earth observation satellite in low orbit or geostationary orbit, down to minus 150° C. for observation of outer space.

This optical precision can be obtained with glass, in particular glass marketed under the trade names Zerodur or ULE, or with beryllium or with ceramic materials such as silicon carbide (SiC). These monolithic materials indeed meet the required specifications. However they have the disadvantage of being heavy. Their weight per unit area effectively ranges from 20 to 50 kg/m2. This limits their diameter to heed permitted satellite weight and hence it limits the theatre surface area for observation of the earth or of space.

An ultra-lightweight and ultra-rigid ceramic reflector is known (US 2003/0117730). This reflector is made in hollowed silicon carbide to lighten the weight.

A method is also known (FR 2 747 240) for manufacturing an antenna reflector formed of a composite material reinforced with fibres and having high surface optical quality. The method described in this document consists of infiltrating a resin between a structural shell and a mould.

Finally, a reflector is known (EP 0 649 036) formed of a sandwich material.

However, these various methods do not allow the fabrication of a lightweight composite mirror having optimal optical characteristics. It is the objective of the present invention to overcome these disadvantages.

The method is characterized in that it comprises the steps consisting of:
providing a glass blank with low coefficient of expansion;
machining a convex shape in the glass blank;
laying a front skin impregnated with resin over the convex shape of the glass blank;
in a rear supporting structure, machining a concave shape matching the convex shape machined in the glass blank;
gluing the concave shape of the supporting structure onto the convex shape of the glass blank;
machining a convex shape in the supporting structure;
laying a rear skin impregnated with resin on a mould with low coefficient of expansion whose shape corresponds to the convex shape of the supporting structure;
gluing a rear skin onto the convex shape of the supporting structure;
turning over the assembly formed by the glass blank, the front skin, the supporting structure and the rear skin so that the blank lies in the upper portion of the assembly;
machining and polishing a mirror in the glass blank.

Preferably the surface of the mirror is coated with a layer of aluminium or a layer of silver on which a silica layer is deposited.

In one particular embodiment, the supporting structure is a honeycomb structure. Advantageously this supporting structure may be formed of juxtaposed equilateral triangles.

Advantageously, the front composite skin is fixed onto the convex shape of the glass blank without any adhesive other than the impregnated resin.

The invention additionally concerns a composite mirror characterized in that it is formed of a supporting structure having a first and a second face, a front composite skin fixed onto the first face of the supporting structure, shaped glass with low coefficient of expansion fixed onto the front skin, a rear composite skin fixed onto the second face of the supporting structure.

Preferably, the shaped glass with low coefficient of expansion is coated with a layer of aluminium or a layer of silver on which a silicon layer is deposited.

Advantageously, the supporting structure is a honeycomb structure. This supporting structure may be formed of juxtaposed equilateral triangles.

In one preferred embodiment, the shaped glass with low coefficient of expansion is fixed onto the front skin without adding a binding adhesive other than the impregnated resin.

Other characteristics and advantages of the present invention will become apparent on reading the following description given with reference to the appended figures. In these figures.

Figure 1A:
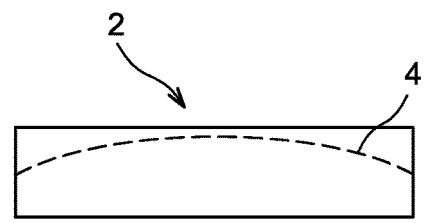
FIGS. 1a to 1i illustrate the different steps of the method of the invention.
Figure 1B:
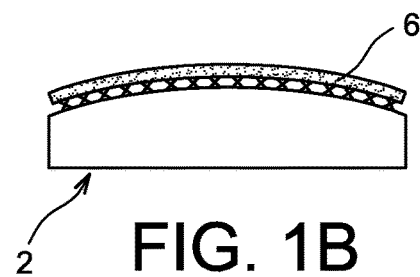
Figure 1C:
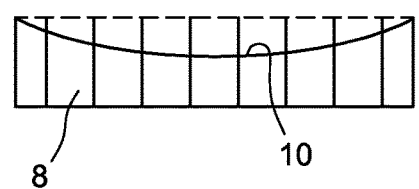
Figure 1D:
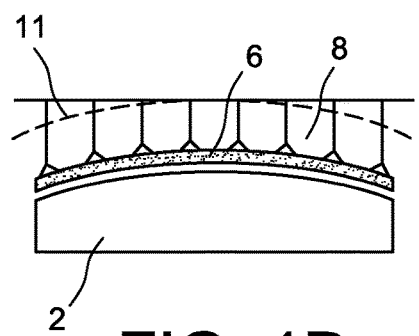

FIG. 1a illustrates a glass blank 2 of cylindrical shape. This glass is glass with low coefficient of expansion. For example it is Zerodur® glass. In the blank 2, a convex shape 4 is machined as schematised by the dotted line.

Figure 3:
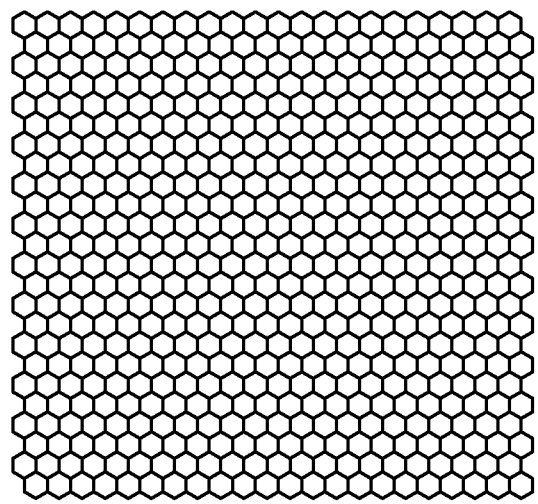
FIG. 3 is a perspective view of the supporting structure in FIG. 2 applied onto a convex shape in glass.
Figure 4:
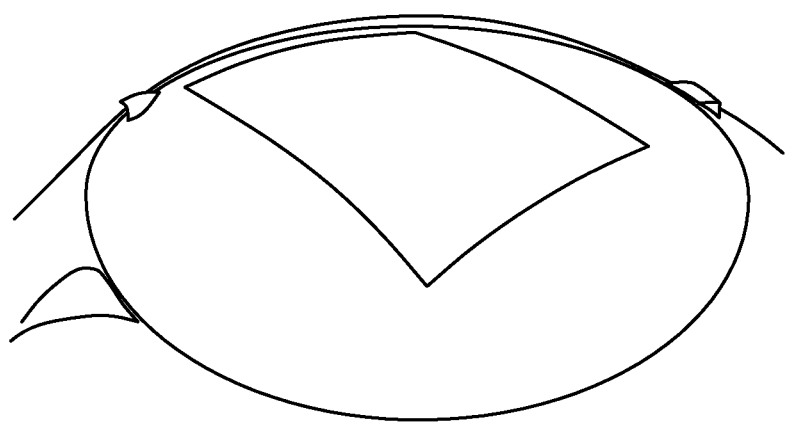
FIG. 4 is a cross-sectional view of part of the structure of a composite mirror conforming to the invention.

At step b, a composite front skin formed of carbon fibre impregnated with resin 6 is laid over the convex shape of the blank in Zerodur® 2 (see also FIG. 3). The composite skin has the same coefficient of expansion as Zerodur®. To attach the front skin 6 onto the blank in Zerodur® 2 thermal, ionic or ultraviolet binding can be used. If necessary the assembly is then cured. In one preferred embodiment, the front composite skin 6 is fixed onto the convex shape of the blank 2 without adhesive other than the impregnated resin.

At step 1c, a supporting structure 8 is fabricated. This supporting structure is an interlayer structure in carbon fibre. A lay-up of twelve 50 micron layers is formed at zero degrees and at more or less 60° relative to the zero degree layers. The YSH50® carbon fibres are impregnated with RS3 cyanate ester resin. The percentage impregnation is 38% for example.

In another embodiment, the supporting structure may be formed of juxtaposed equilateral triangles.

Figure 2:
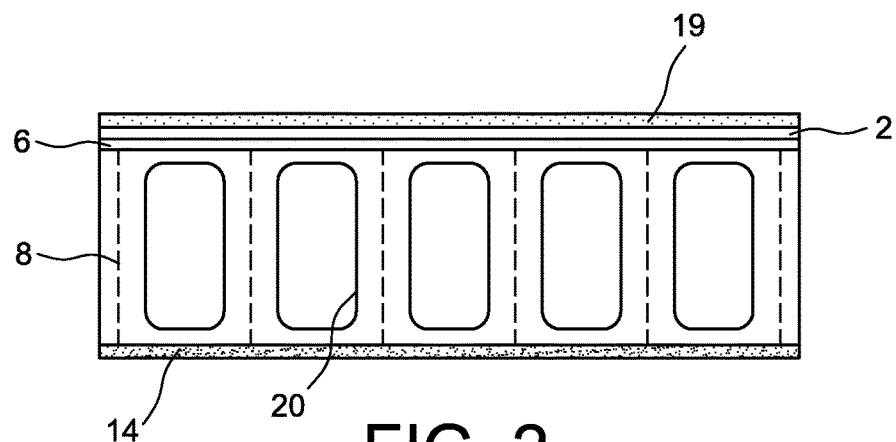
FIG. 2 is a plan view of an example of a supporting structure conforming to the invention.

It is also possible to use a commercially available material capable of meeting needs such as the carbon fibre honeycomb material marketed under the trade name ULTRACORE®, as illustrated in FIG. 2.

This structure 8 is machined so as to form a concave shape 10 whose shape matches the convex shape of the composite skin formed of carbon fibre 6. At step 1d, the supporting structure 8 has been turned over and it has been placed on the composite skin in carbon fibre 6. The structure 8 is glued onto the skin in carbon fibre 6. The back of the structure 8 is machined so as to form a convex shape as schematised by the dotted line 11. The structure 8 can be machined so that machining is parallel to the shape of the skin 6. It is also possible for machining to impart a different shape, for example a shape that is thicker in the middle than at the edges.

Figure 1E:
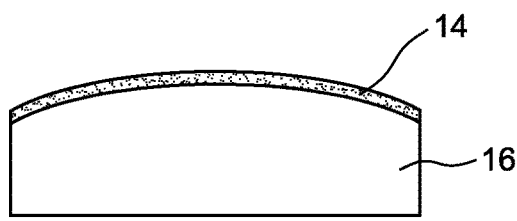
Figure 1F:
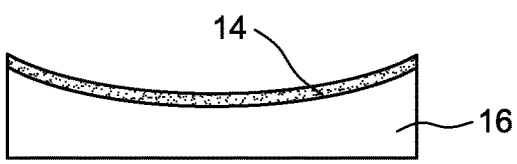

In parallel, a rear skin 14 is laid in a mould with low coefficient of expansion, for example a mould in invar. This mould is of convex shape as illustrated in FIG. 1e. Or it may have a concave shape as illustrated in FIG. 1f.

Figure 1G:
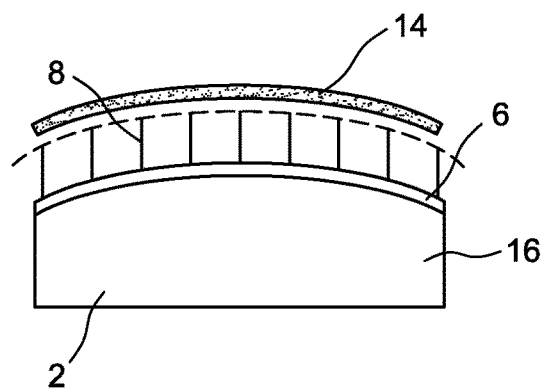

The rear skin 14 is then cured if necessary, then the rear skin 14 is released from the mould and glued onto the supporting structure 8 as schematised in FIG. 1g.

In both cases, the convex or concave shape of the rear skin 14 matches the machined shape 10 of the supporting structure 8.

Figure 1H:
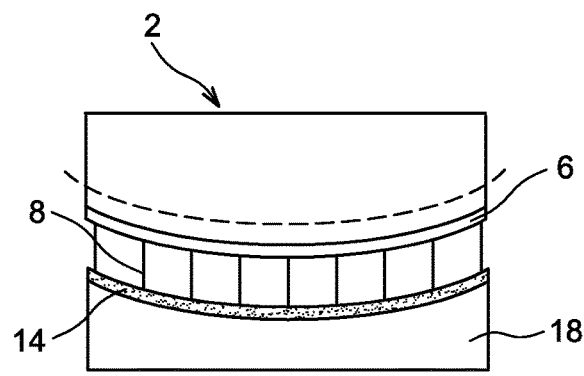

Starting from the position illustrated in FIG. 1g, the blank in Zerodur® 2 being in the lower position, the assembly formed by the blank in Zerodur®, the front skin 6 of the supporting structure 8 and the rear skin 14 is turned over to arrive at the position illustrated in FIG. 1h. The assembly rests on a cradle 18. In one variant of embodiment, this cradle can be formed by the mould in invar of concave shape 16 illustrated in FIG. 1f. The rear face of the blank in Zerodur® 2 is then machined as schematised by the shading in FIG. 1h. The subsisting thickness of Zerodur® is as thin as possible for maximum reduction in the weight of the mirror. For example, this thickness is between 0.5 and 1 mm. The machined blank is then polished.

Polishing is the step which allows predicted differences of global and local distortions to be offset.

Another possibility is to machine and polish not on the theoretical surface but on a surface that is modified so that the theoretical surface of the mirror is restored at operating temperature and hygrometry (0%).

Figure 1I:
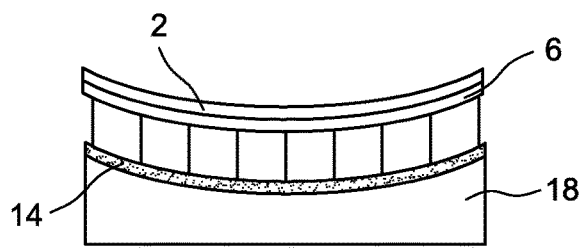

This leads to the final step illustrated in FIG. 1i. The shaped glass 2 with low coefficient of expansion 2 is coated with a layer of aluminium or a layer of silver on which a layer of SiO2 is deposited.

The structure is sufficiently rigid so that it is not deteriorated by the thinness of the metal and silica deposits.

FIG. 2 is a cross-sectional view of part of a composite mirror conforming to the present invention. As seen from top to bottom it shows the rear skin 14, the supporting structure 8 and the front skin 6 supporting the machined and polished Zerodur® layer 2. On the Zerodur® layer 2 are the deposit of aluminium or silver and the silica deposit 19, and in the example of embodiment it can also be seen that the supporting structure 8 comprises openwork 20 intended to further reduce the weight thereof.

The precision of shape and thermal stability of the front skin 6 is adjusted by imparting to it an adapted lay-up sequence and percentage resin impregnation so as to obtain a coefficient of expansion identical to that of the Zerodur®. For example, the resin may be a cyanate ester with low water uptake.

The binding of the skin 6 with the material of the supporting structure 8 is obtained using an optimised amount of adhesive so as to limit induced distortions.

The geometry of the supporting structure 8 is the result of global optimisation. The supporting structure can be formed in the same material with the same lay-up sequence as the skins to obtain the same coefficient of expansion. This coefficient is approximately $0.02 \times 10^{-6}/°$ C.

Three major parameters govern the final precision of the composite mirror:

the lay-up precision of the skins 6 and 14 and the isotropic precision of the material of the supporting structure 8. This precision can be obtained using an automatic laying-up machine;

the percentage impregnation with (cyanate) resin of the prepreg. As a first approximation, a precision of more or less 1% is desirable;

the curing cycle. This must be adapted to minimise long-term stresses recorded on cooling. Resins are used having a low curing temperature, for example lower than 100° C., with a heat gradient of less than 2° C.

The invention claimed is:

1. A method for producing a composite mirror for an observation satellite, comprising the steps of:
   providing a glass blank with a low coefficient of expansion;
   machining a convex shape in the glass blank;
   laying a front skin impregnated with resin over the convex shape of the glass blank;
   machining, in a rear supporting structure, a concave shape matching the convex shape machined in the glass blank;
   gluing the concave shape of the supporting structure onto the convex shape of the glass blank;
   machining a convex shape in the supporting structure;
   laying a rear skin impregnated with resin in a mould with a low coefficient of expansion whose shape matches the convex shape of the supporting structure;
   gluing the rear skin onto the convex shape of the supporting structure, turning over the assembly formed by the glass blank, the front skin, the supporting structure and the rear skin so that the blank lies in the upper portion of the assembly; and
   machining and polishing a mirror in the glass blank.

2. The method for producing a mirror according to claim 1, wherein the surface of the mirror is coated with a layer of aluminium or a layer of silver on which a silica layer is deposited.

3. The method for producing a mirror according to claim 1 or 2, wherein the supporting structure is a honeycomb structure.

4. A method for producing a mirror according to claim 1 or 2, wherein the supporting structure is formed of juxtaposed equilateral triangles.

5. The method for producing a mirror according to one of claim 1 or 2, wherein the front skin is fixed onto the convex shape of the glass blank without adding any binding adhesive other than the impregnated resin.

* * * * *